United States Patent [19]

Mueller et al.

[11] Patent Number: 5,441,218
[45] Date of Patent: Aug. 15, 1995

[54] OVERHEAD LUGGAGE COMPARTMENT SYSTEM FOR PASSENGER AIRCRAFT

[75] Inventors: Hans-Juergen Mueller, Henstedt-Ulzburg; Ralf Schliwa, Hamburg, both of Germany; Guenther Schwertfeger, Tournefeuille, France

[73] Assignee: Deutsche Aerospace Airbus GmbH, Hamburg, Germany

[21] Appl. No.: 34,100

[22] Filed: Mar. 22, 1993

[30] Foreign Application Priority Data

Mar. 20, 1992 [DE] Germany ............ 42 09 037.7

[51] Int. Cl.⁶ ............................................. B64D 11/00
[52] U.S. Cl. ................................ 244/118.1; 312/248; 312/269; 244/118.5
[58] Field of Search ............. 244/118.1, 118.5, 117 R, 244/119, 137.1; 312/266, 269, 246, 247, 248, 272, 319.1, 7.1, 7.2, 325, 326, 28; 105/321, 315; 5/9, 10 R; 49/205, 206, 248, 379

[56] References Cited

U.S. PATENT DOCUMENTS

| | | | |
|---|---|---|---|
| 1,882,338 | 10/1932 | Reed et al. | 244/137.1 |
| 4,368,937 | 1/1983 | Palombo et al. | 312/269 |
| 5,096,271 | 3/1992 | Portman | 244/118.5 |
| 5,244,269 | 9/1993 | Harriehausen et al. | 312/247 |
| 5,249,858 | 10/1993 | Nusser | 312/248 |

Primary Examiner—Galen L. Barefoot
Attorney, Agent, or Firm—W. G. Fasse; W. F. Fasse

[57] ABSTRACT

An overhead luggage compartment system for a passenger aircraft is equipped with luggage compartments formed as shells that can be adjusted in their tilted position and in their elevated position for easy access. In the closed position the shells are fully recessed into the ceiling structure of the aircraft cabin. Such a structure does not require any separate covers or lids for the luggage compartments. Additionally, a power drive lifts, lowers, and tilts the compartment shells. In the lowered position the shells are fully accessible even for short people. In the upper, recessed position the shells are closed and locked.

14 Claims, 4 Drawing Sheets

OVERHEAD LUGGAGE COMPARTMENT SYSTEM FOR PASSENGER AIRCRAFT

CROSS-REFERENCE TO RELATED APPLICATION

The present application relates to U.S. Ser. No. 07/942,974, filed on Sep. 10, 1992, now U.S. Pat. No. 5,244,269; for "OVERHEAD BAGGAGE COMPARTMENT WITH A LOWERABLE TROUGH, ESPECIALLY FOR PASSENGER AIRCRAFT".

FIELD OF THE INVENTION

The invention relates to an overhead luggage compartment system for passenger aircraft. Such compartments normally have a closeable lid and are arranged in an overhead area below the ceiling of the passenger cabin in an aircraft.

BACKGROUND INFORMATION

The overhead space in an aircraft cabin is conventionally available for storing on-board luggage in box-shaped compartments. Different types of locking mechanisms are used for keeping the luggage boxes or compartments locked, especially during take-off and landing. Different kinds of lids are also known, for example in the form of hinged flaps, slideable doors, or recessible covers made of a plurality of lamellae or parallel slots. Known overhead constructions make it difficult, or at least cumbersome to stow the luggage and to retrieve the luggage, especially for short people.

OBJECTS OF THE INVENTION

In view of the foregoing, it is the aim of the invention to achieve the following objects singly or in combination:
- to construct a luggage compartment for an aircraft in such a way that access to the individual compartments for loading and unloading is substantially improved, even for short people, whereby lids or doors are avoided altogether while nevertheless permitting the closing of the compartments;
- to provide a simple, yet safe locking of these compartments to avoid an accidental falling of luggage pieces;
- to arrange the luggage compartments in such a way that a good overview is provided to avoid that luggage pieces are hidden from view;
- to provide a power assisted opening and closing of such luggage compartments including a lifting or lowering thereof;
- to provide a clearly visible indication that the individual compartment is open, closed, or closed and locked; and
- to provide a safety feature so that a compartment lid will be automatically opened if something should have gotten stuck between the lid and the compartment housing, such as a hand or a piece of clothing.

SUMMARY OF THE INVENTION

The above objects have been achieved according to the invention by a luggage compartment that is constructed as a shell and that is connected to the support structure, such as the ceiling of the aircraft, by a position adjustable mechanism, which is connected to a position adjustment drive for moving the compartment between a lowered loading and unloading position on the one hand, and an out of the way upper flight position on the other hand. The position adjustable mechanism also permits tilting the shell into a closed, recessed position. The shell is open upwardly and preferably also laterally.

By lowering the luggage compartment shell from the upper position into the lower position, a convenient loading and unloading is possible, even for short persons, because the opening of the luggage compartment shell is positioned at an ergonomic advantageous level. As a result, not only the loading and unloading is much more convenient, the low position also provides a good overview to see whether any pieces of luggage still remain in the compartment shell. After the loading or unloading is completed, a controlled drive is provided that positions the luggage compartment shell in the out of the way position where it blends into the contour of the supporting structure, such as the ceiling of the aircraft cabin. Additionally, in the out of the way position the luggage compartment is so oriented that pieces of luggage are prevented from falling out. More specifically, the opening into the luggage compartment in the out of the way position of the luggage compartment is no longer visible from the passenger space in the cabin, whereby the shell is also properly closed.

The position adjustable mechanism for the present shell is so constructed that the shell is tiltable relative to the supporting structure, whereby the adjustment or tilting mechanism is still as simple as possible, yet does not require a large installation volume since the number of structural components for a lifting lowering, and tilting operation of the compartment shell is relatively small.

According to the invention the adjustable mechanism is power driven, preferably by a pneumatic system that receives its power from one or more compressors connected to pneumatic piston cylinder devices through respective pressure conduits, whereby the system may also comprise pressure storage containers.

The overhead luggage compartment shell is especially easily accessible for a safe placement of the luggage in the compartment in that the compartment shell opening faces laterally when the shell is in the loading and unloading position and that the opening faces in a direction that is slanted, at least to the vertical direction, when the compartment shell is in the out of the way, upper transport position.

The power driven adjustment mechanism for the luggage compartments comprises a control unit for controlling electrically operable valves which in turn control the supply of pressurized fluid, e.g. air piston cylinder devices as desired, whereby the instantaneous operational status of these electrical control valves depends on the operation of the control unit.

Preferably, the supply of pressurized air is also automatically controlled in response to pressure sensors which determine the instantaneous operational conditions, whereby the control unit responds automatically to these conditions, for example, when a hand or piece of luggage should have gotten stuck.

An efficient utilization of the available space is accomplished by the present power drive system which uses a pneumatic piston cylinder device which is connected to the compartment shell by means of a mechanical guide and lever system constructed as a rope pull or cable pull including a number of guide pulleys thereby providing a compact power drive.

A uniform force application to the compartment shell for preventing any jamming is achieved in that the positioning of the compartment shell is accomplished with two pneumatic piston cylinder devices arranged laterally at each end of the shell, whereby these piston cylinder devices are connected through intermediate levers to the support structure.

Preferably, the power operation of the compartment shell is delayed until a locking mechanism that locks the shell in an out of the way position has released the shell. For this purpose, the piston cylinder device, or rather the application of pressure to the piston cylinder device is responsive to a solenoid operating as a locking magnet, whereby the arrangement is such that the pressure application to the pneumatic piston cylinder device is prevented until the locking magnet has released the shell.

In order to make the operation of the power driven luggage compartments more convenient, especially for passengers, and in order to avoid erroneous operations, an optical indicator is provided that shows to passengers and flight attendants alike whether the compartment is ready to be released, whether it is merely closed, or whether it is closed and locked. Different colors are preferably used for this optical indication.

According to the invention it is also assured that accidents involving the clamping of fingers or pieces of clothing between the luggage compartment and stationary components of the aircraft are prevented. For this purpose, the opening edge of the luggage compartment shell is provided with a sensor preferably as a rubber profile surrounding a graphite core, whereby an electrical signal is provided by the graphite core which generates the signal in response to pressure on the graphite core. The signal is transmitted through an electric circuit to the control of the control valves, whereby the power drive opens the compartment shell.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
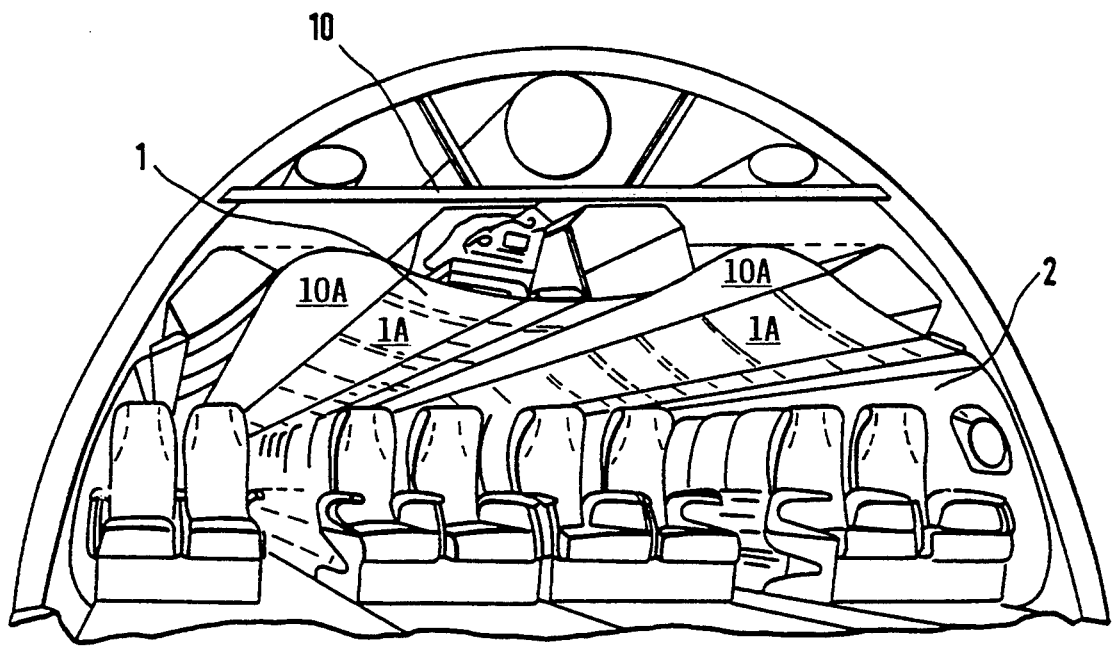
FIG. 1 is a perspective view into a passenger cabin of an aircraft showing the overhead luggage compartments according to the invention in the closed condition.

FIG. 1 shows an aircraft body 2 having a ceiling structure 10 that forms a supporting structure for the overhead luggage compartment system 1. The luggage compartment system comprises individual boxes 1A which are shown in their upper, closed position in FIG. 1. The boxes 1A have a downwardly facing wall 1B which is so curved that it merges into a curved ceiling structure when the boxes are closed.

Figure 2:
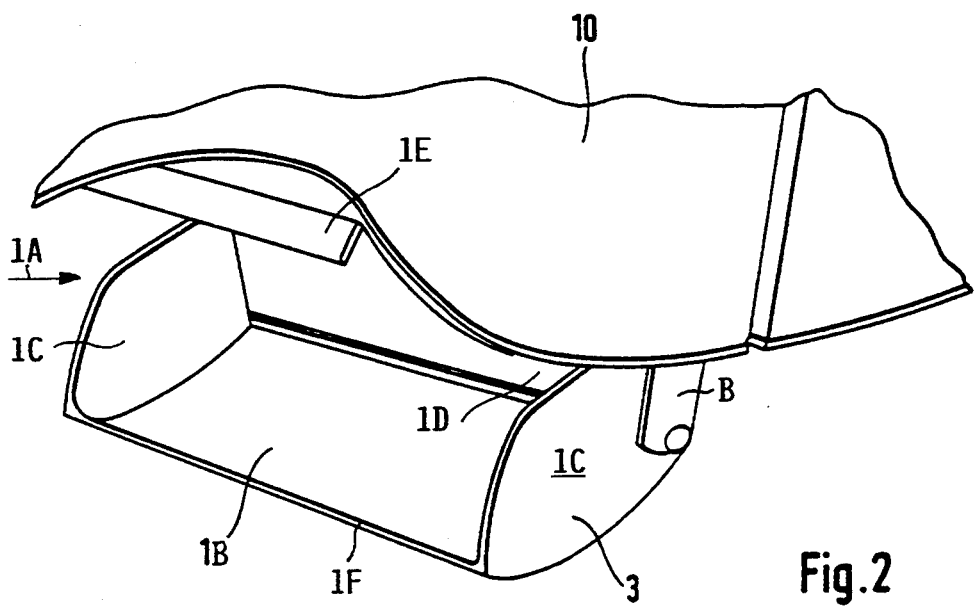
FIG. 2 is a perspective view of a single luggage compartment according to the invention in its open condition.

FIG. 2 shows a box 1A formed as a shell 3 with the above mentioned bottom wall 1B and side walls 1C, as well as a rear wall 1D. A molding 1E rigidly secured to the supporting structure 10 cooperates with the lower or outer edge 1F of the shell 3 when the shell is closed, as will be described in more detail below with reference to FIG. 5. A mounting bracket B that is adjustable in its position permits the lowering and raising of the shell 3 as will also be described in more detail below. When the shell 3 is opened as shown in FIG. 2, it is fully accessible and its inside is fully visible, especially when the shell is lowered to a position convenient even for short people.

Figure 3:
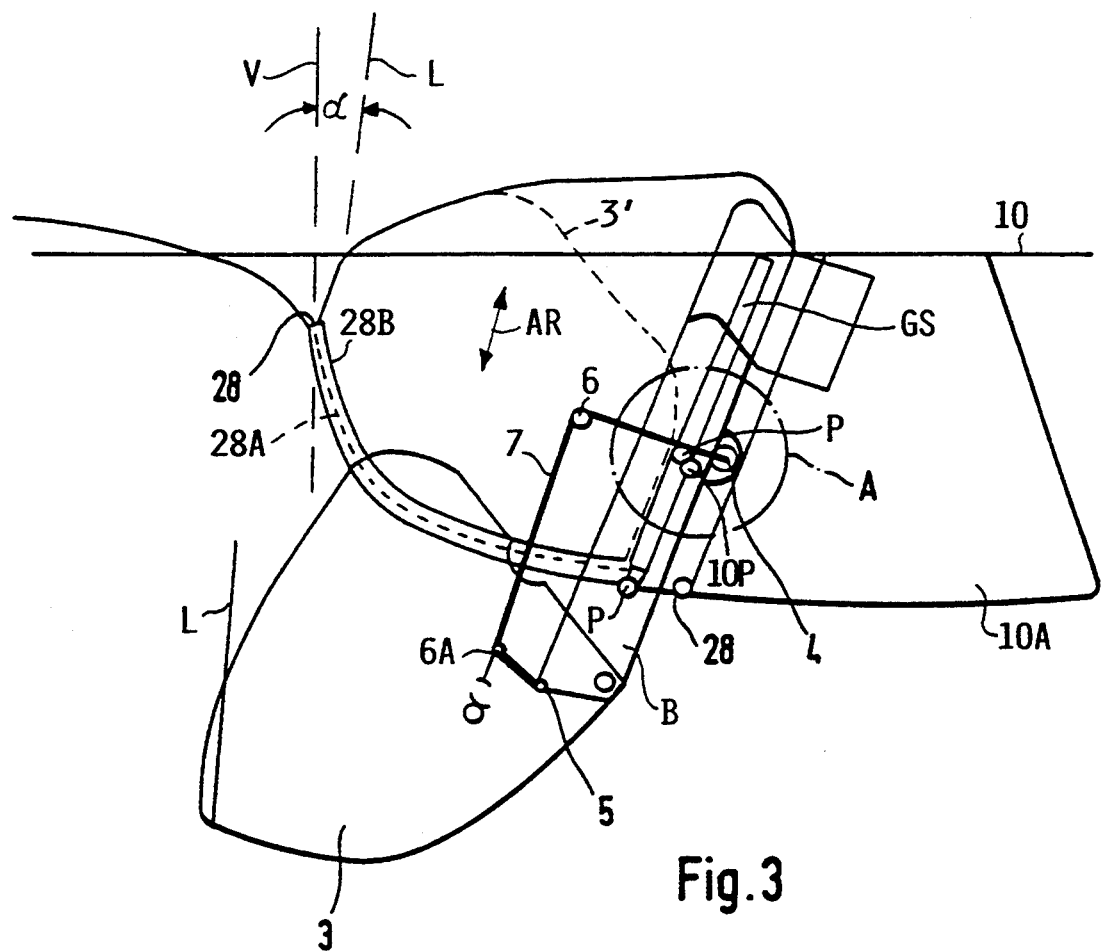
FIG. 3 is a side view of the luggage compartment according to the invention in its open condition and illustrating the power drive for the opening and closing of the compartment including its lowering and lifting.

FIG. 3 shows a power drive in the form of a piston cylinder device 4 arranged for raising and lowering the shell 3 with the aid of a rope or cable pull 7. For this purpose the shell 3 is rigidly secured to the bracket B which is provided with a guide slot GS which permits the bracket B and thus the shell 3 to move up and down as indicated by the arrow AR. For this purpose, the slot GS is guided by guide pins P which are rigidly secured to the supporting structure and reach into the slot GS. The cable 7 of the cable pull runs around guide pulleys or sheaves 6 rotatably secured to the support structure and over a guide pulley 6A secured to the shell 3. One end of the rope or cable 7 is secured to the shell 3 and the bracket B by a pin 5. The other end of the cable 7 is secured to the free end of the piston of the pneumatic drive 4. For this purpose, the piston end has a fork head 9 to which the cable end is secured. The pulley 6 forms a fixed point against which the shell 3 can be lifted.

Figure 4:
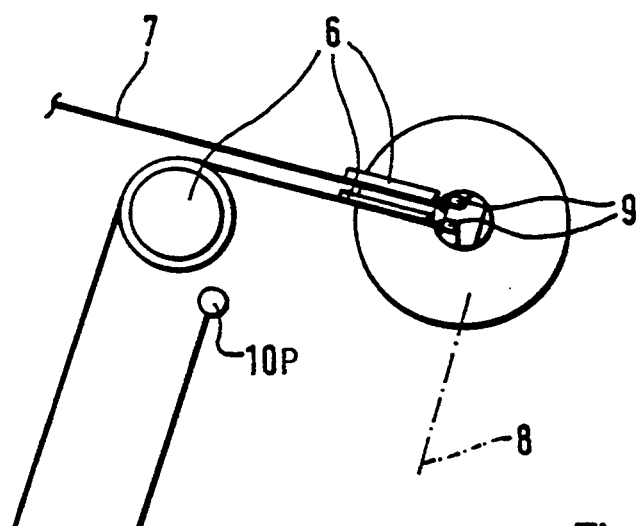
FIG. 4 is an enlarged illustration of a rope or cable pull for coupling the compartment shell to a power drive in the form of a pneumatic piston cylinder device.

FIG. 4 shows that one end of the rope or cable 7 may also be connected to a fixed point 10P, such as a pin secured to the supporting structure 10, whereby again the rope or cable 7 runs around pulleys 6 and its other end is connected to the shell 3, while the fork head 9 engages an intermediate portion of the rope or cable 7. The piston cylinder device 4 has a cylinder 8 which is connected to pressurized fluid controlled as will be described below.

Figure 6:
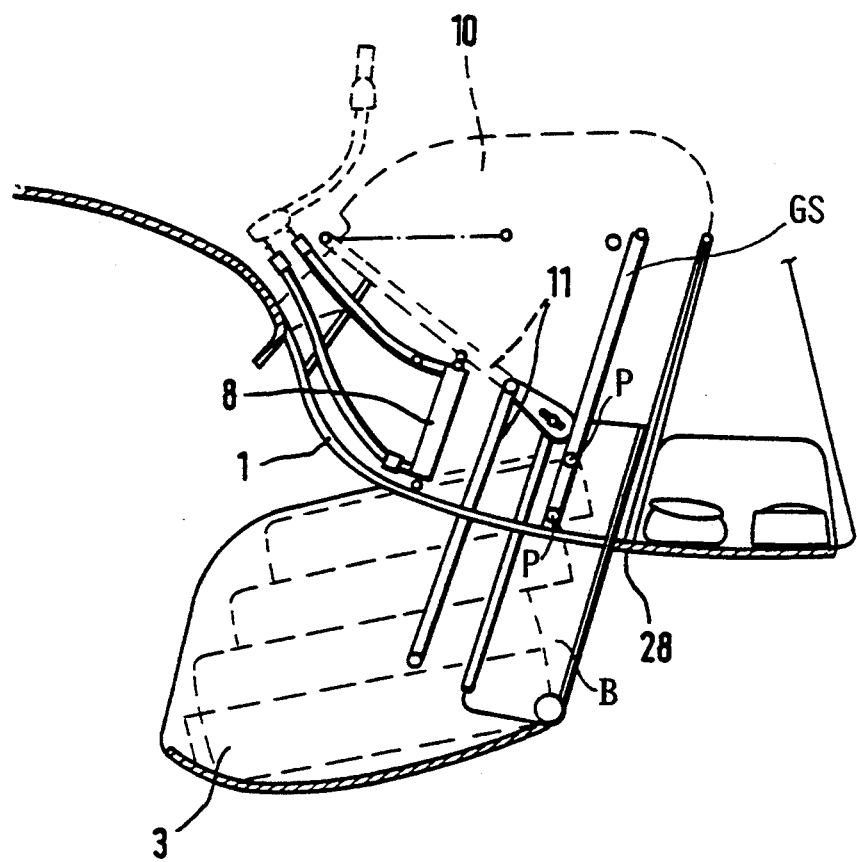
FIG. 6 illustrates another embodiment of a power drive for opening and closing luggage compartments according to the invention.

FIG. 6 shows an embodiment in which the rope and pulley system has been replaced by another power drive comprising two piston cylinder devices 8', one of which is arranged at each shell end 1C. The shell 3 is again supported by a bracket B that is movable up and down as described. The cylinder of the devices 8' is, for example, connected to the supporting structure 10 and the piston rod is connected to the shell 3, preferably through a guide linkage 11 which makes sure that jamming is avoided.

Figure 5:
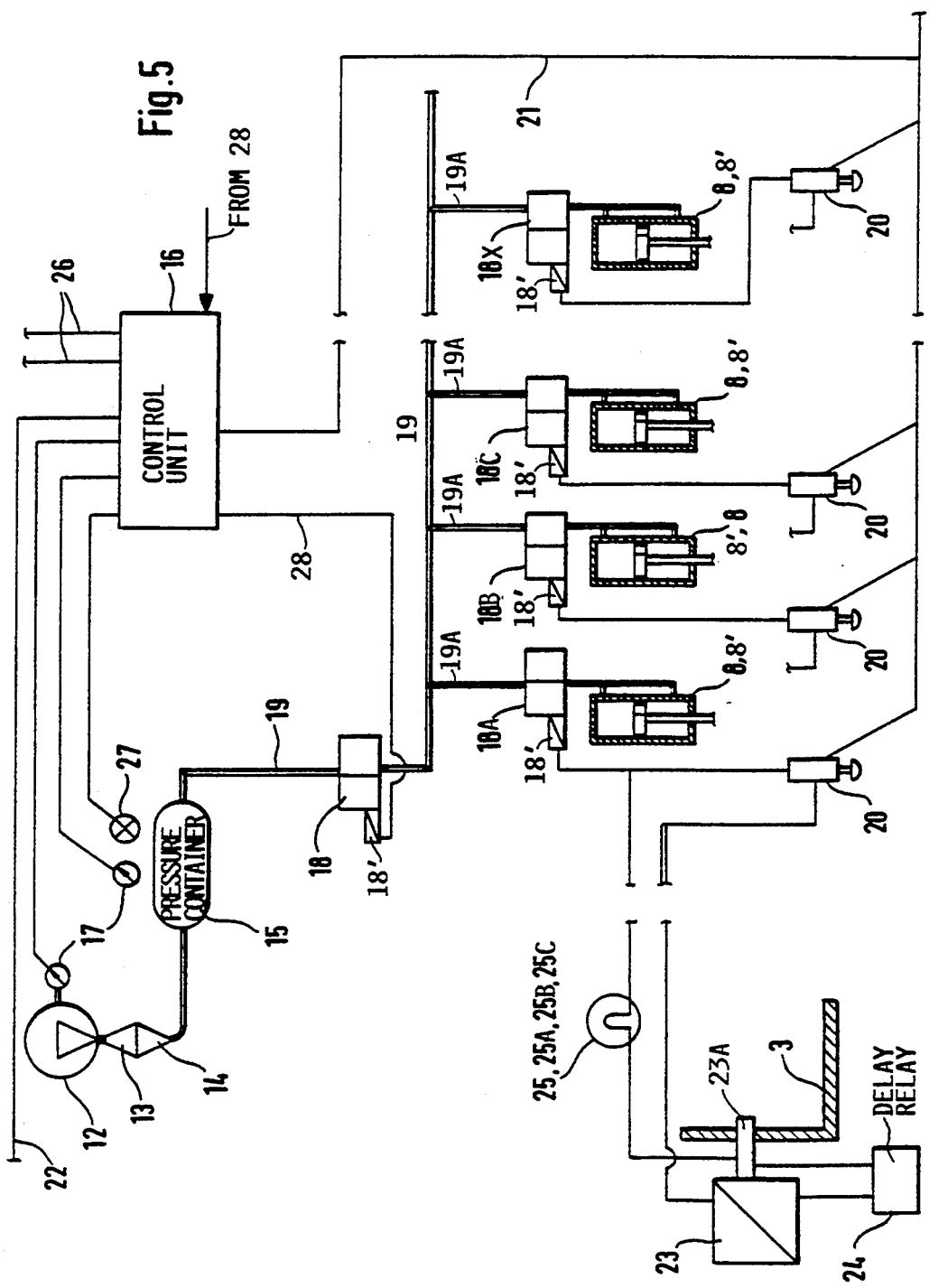
FIG. 5 shows an electric and pneumatic circuit diagram of the present control unit for the compartment positioning power drives.

The pneumatic or hydraulic and electrical control elements are illustrated in FIG. 5. A compressor 12 pressurizes a pressure container 15 through a filter 13 and a water removal trap 14. The system of FIG. 5 is a pneumatic system. However, hydraulic systems are equally suitable. The pressure container 15 is maintained at a predetermined pressure that depends on the size of the system. A valve 27 provides pressure equalization.

A control unit 16 receives input signals from pressure sensors 17 and 28. The latter will be described below. The pressure sensors provide information indication to the control unit how control valves 18, 18A, 18B, and so forth to 18X are to be controlled in accordance with the instantaneously prevailing pressure requirement and/or excess pressure. The control unit 16 controls the valves 18 through solenoids 18' which are also individually controllable by switches 20 provided at the location of the particular compartment shell 3. The main pressure line 19 can be opened and closed by a valve 18 through its solenoid 18' by the control unit 16. Branch lines 19A extend from the main line 19 individually to each of the valves 18A to 18X, which are also individually controlled through respective solenoids 18'. The control through the above mentioned individual switches 20 can be prevented by an override electrical control circuit 21 under the control of the control unit 16. An electrical conductor 22 provides a remote control from the cockpit or the like, for example, a purser station, for operating the control of the entire system. By this remote control a flight attendant or the pilot can make sure e.g. during starting and landing and during emergencies, that passengers cannot operate their switches 20. Further, the arrangement is such that certain groups or blocks of shells can be locked so that when "pox boarding" takes place and there is a crowd of passengers in the aisles of the aircraft, individual passengers cannot block the further advance of passengers to their seats by starting to store their luggage.

The passenger controlled switches 20 further control lifting magnets 23 that operate locking elements 23A engaging an edge of a shell 3 when the latter is in a closed, uplifted position. Preferably, the locking mechanism 23A is operated with a certain delay determined by a delay relay 24. This delay relay prevents the pressure application to the respective pneumatic cylinder 8, 8' until the lifting magnet 23 has withdrawn the locking element 23A from the respective hole in the edge of the shell 3.

According to the invention, there is also provided an optical indicator light 25, 25A, 25B, 25C, and so forth for each compartment indicating, for example, by a green light 25A that the respective shell is ready for loading or that luggage can be removed. A blue light 25B indicates that the shell is in a closed, but not yet locked position. A red light 25C indicates that the shell is closed and locked. These lights also provide information to a flight attendant when any passenger needs help.

The electrical power supply 26 and the pressure equalization or relief valve 27 are conventional.

Referring again to FIG. 3, in order to prevent accidents, for example, the clamping of a hand between the shell 3 and an edge of the supporting structure 10, these edges are equipped with pressure sensors 28 in the form of a graphite core 28A in a rubber sleeve 28B. These sensors surround the entire edges and are so constructed that the electrical power supply through the conductor 28 to the solenoid 18' of the main valve 18 is instantaneously interrupted in response to a pressure change in the sensors 28, for example, when a passenger's hand is stuck in the gap between the edge of the shell and the edge of the supporting structure. The operation then proceeds so that the respective shell is automatically opened and it is thus not possible that a passenger's hand, a piece of luggage, or clothing is clamped and damaged. Upon removal of the obstacle the shell may then be properly closed.

In FIG. 3, a line L forms an angle $\alpha$ with the vertical V when the shell 3 is in its closed position indicated by a dashed line 3'. The line L defines an opening plane of the shell 3.

Although the invention has been described with reference to specific example embodiments it will be appreciated that it is intended to cover all modifications and equivalents within the scope of the appended claims.

What we claim is:

1. An overhead luggage compartment system for passenger aircraft, comprising a lockable shell forming a luggage compartment arranged in an overhead area of a passenger cabin, said compartment shell forming a box having an opening, said system further comprising mounting means for adjustably securing said shell to a supporting structure, and a power drive connected to said adjustable mounting means for positioning said shell in a loading position, an unloading position, and in a recessed, closed position, and a control device connected to said power drive means for controlling said power drive means, said control device comprising a passenger operated control element (20) for operating said power drive for said luggage compartment, and a remote control (22) operable by a crew member for preventing a passenger initiated control.

2. The compartment system of claim 1, wherein said mounting means comprise means connected to said shell and to said supporting structure for tiltably mounting said shell to said supporting structures.

3. The compartment system of claim 1, wherein said mounting means comprise means connected to said shell and to said supporting structure for adjustably raising or lowering said shell by said power drive means.

4. The compartment of claim 1, wherein said power drive means comprise a pressure fluid operated device operatively linked to said shell and to said supporting structure.

5. The compartment system of claim 1, wherein said opening of said shell assumes one position when said shell is in a loading and unloading position, and another position when said shell is in a recessed, closed condition, said other position being such that an opening plane of said opening of said shell forms an angle with a vertical line.

6. The compartment system of claim 1, wherein said means for controlling comprise electrically operable valves for selectively admitting pressurized fluid to said power drive means, and valve control means arranged for opening or closing said electrically operable valves.

7. The compartment system of claim 1, further comprising at least one pressure sensor arranged so that pressure within the system is ascertained to form a respective control signal to be supplied to said means for controlling.

8. The compartment system of claim 1, wherein said power drive means comprise a pneumatic piston cylinder device connected for positioning said shell, and a rope or cable pull for coupling said pneumatic piston cylinder device to said shell.

9. The compartment system of claim 1, wherein said power drive means comprise two pneumatic piston cylinder devices arranged laterally of the respective shell, and wherein said power drive means further comprise intermediate lever links for securing said pneumatic cylinders to said supporting structure.

10. The compartment system of claim 1, further comprising magnet means for locking said shell in a closed position, said control means comprising a delay relay operatively arranged for delaying a supply of power to said power drive means until said magnet means has released a locking of said shell.

11. The compartment system of claim 1, further comprising optical indicator means for providing information regarding an instantaneous status of said shell, namely a shell open position, a shell closed position, and a shell locked position.

12. The compartment system of claim 11, wherein a green light is provided for indicating that the shell is open for loading or unloading, wherein a blue light is provided for indicating that the shell is closed, and wherein a red light is provided for indicating that the shell is closed and locked.

13. The compartment system of claim 1, further comprising pressure sensor means positioned to ascertain any clamping of parts of a passenger or clothing or luggage between said shell and said supporting structure, and conductor means connecting an output signal of said pressure sensor means to said control means for providing a stop signal stopping a closing operation of said power drive means and to cause an opening of said shell.

14. The compartment system of claim 13, wherein said pressure sensor means comprises a graphite core surrounded by a rubber profile for producing a pressure responsive electrical control signal.

* * * * *